United States Patent
Nishizawa et al.

(10) Patent No.: US 10,561,166 B2
(45) Date of Patent: Feb. 18, 2020

(54) CURDLAN-CONTAINING COMPOSITION AND PRODUCT COMPRISING CURDLAN-CONTAINING COMPOSITION

(71) Applicant: ORGANO FOOD TECH CORPORATION, Saitama (JP)

(72) Inventors: Takuya Nishizawa, Saitama (JP); Masaru Yanagisawa, Saitama (JP); Ken Ota, Saitama (JP)

(73) Assignee: ORGANO FOOD TECH CORPORATION, Satte-Shi (JP)

( * ) Notice: Subject to any disclaimer, the term of this patent is extended or adjusted under 35 U.S.C. 154(b) by 0 days.

(21) Appl. No.: 15/537,656

(22) PCT Filed: Dec. 25, 2015

(86) PCT No.: PCT/JP2015/086308
§ 371 (c)(1),
(2) Date: Jun. 19, 2017

(87) PCT Pub. No.: WO2016/104735
PCT Pub. Date: Jun. 30, 2016

(65) Prior Publication Data
US 2017/0347695 A1    Dec. 7, 2017

(30) Foreign Application Priority Data

Dec. 26, 2014 (JP) ................................ 2014-264573

(51) Int. Cl.
*A23L 29/269*    (2016.01)
*A23L 13/70*    (2016.01)
*A23L 13/60*    (2016.01)
*A23L 13/40*    (2016.01)

(52) U.S. Cl.
CPC .......... *A23L 29/271* (2016.08); *A23L 13/426* (2016.08); *A23L 13/65* (2016.08); *A23L 13/72* (2016.08); *A23V 2002/00* (2013.01)

(58) Field of Classification Search
None
See application file for complete search history.

(56) References Cited

U.S. PATENT DOCUMENTS 3,930,052 A * 12/1975 De Brou ............... A23L 29/284
426/576
2014/0017363 A1    1/2014 Aibe et al.

FOREIGN PATENT DOCUMENTS

| CN | 102344571 | | 2/2012 |
| CN | 103415220 (A) | | 11/2013 |
| CN | 103931985 | | 7/2014 |
| JP | 10-42802 | | 2/1998 |
| JP | 11-75723 | | 3/1999 |
| JP | 2011-050306 | | 3/2011 |
| JP | 2014-140345 | | 8/2014 |
| JP | 2014140345 A | * | 8/2014 |
| WO | 2012/133658 | | 10/2012 |

OTHER PUBLICATIONS

Takaaki Ito, "Application of Alkaline Solution of Curdlan to Oriental Noodles", A Technical Journal on Food Chemistry & Chemicals, vol. 15, No. 10, ISSN: 0911-2286; Oct. 1, 1999; p. 65-68 with partial English translation.
Tsuyoshi Hibino et al., "Development of Formulation Considering the Intake Easiness (Part 2), Film Coating to Granules", Reports of the Mie Prefectural Science and Technology Promotion Center Industrial Research Division, Japan, Mie Prefectural Science and Technology Promotion Center Industrial Research Division, Issn: 32; 2008, pp. 102.
Tsuyoshi Tanimoto, "Revised Points of Japanese Pharmacopoeia 16th Edition", Hirokawa-shoten Ltd.; May 2011; pp. 10.
Internaitonal Search Report issued in Patent Application No. PCT/JP2015/086308, dated Mar. 29, 2016.
International Preliminary Examination Report in PCT/JP2015/086308 dated Jun. 29, 2017.
Official Action dated May 24, 2019 in Taiwanese application No. 104143827, and English language translation thereof.
Office Action in CN Application No. 201580071051.6 dated Nov. 25, 2019, and English translation thereof.

* cited by examiner

*Primary Examiner* — John Pak
*Assistant Examiner* — Daniel L Branson
(74) *Attorney, Agent, or Firm* — Greenblum & Bernstein, P.L.C.

(57) ABSTRACT

Provided are a curdlan-containing composition which is unlikely to aggregate when dispersed or dissolved in water and with which a curdlan dispersion or solution can be easily prepared, and a food product and any other products containing the curdlan-containing composition. The curdlan-containing composition contains curdlan and an alkali salt, and the curdlan and the alkali salt are granulated.

6 Claims, No Drawings

CURDLAN-CONTAINING COMPOSITION AND PRODUCT COMPRISING CURDLAN-CONTAINING COMPOSITION

TECHNICAL FIELD

The present invention relates to a curdlan-containing composition that contains curdlan and an alkali salt, and also relates to a foodstuff and any other products that contains the curdlan-containing composition.

BACKGROUND

Curdlan is used as a polysaccharide thickener in a variety of fields, mainly for applications aimed at improving physical properties, including thickening, gelling, water retention and shape retention.

Although curdlan has an effect even when used as a powder, because it is insoluble in water, achieving satisfactory manifestation of the functions of curdlan in the production of processed foodstuffs and the like has proven difficult.

Curdlan is insoluble in water in acidic through to nearly neutral conditions, and therefore when simple curdlan is added to water, a curdlan precipitate sometimes forms. Because curdlan is soluble in alkaline aqueous solutions, when preparing an aqueous solution of curdlan, a dispersion containing the curdlan dispersed in water and an alkaline solution are prepared separately in advance, and must then be subjected to mechanical mixing or the like using a stirrer or the like.

In this manner, although curdlan does become soluble in water under alkaline conditions, because aggregates (so-called "lumps") form if the curdlan is simply added directly to an alkali solution, meaning the production of a curdlan solution requires the preparation of two liquids, namely a curdlan aqueous solution and an alkali solution, the production process for a curdlan aqueous solution has tended to be complex (see Patent Document 1). In order to reduce the effort required to prepare this type of curdlan aqueous solution, one possible method involves preparing a mixture in advance containing a powdered blend of curdlan and an alkali agent, and then adding this mixture to water and stirring to obtain a curdlan dispersion, but when a mixture that has been prepared using the pH of the mixed solution as an indicator is added to water, aggregation tends to occur, and producing a uniformly dispersed solution is difficult.

One known curdlan mixture that addresses this problem is a curdlan mixture that uses a coated alkali agent (see Patent Document 2). When this mixture is added to water, because the elution of the alkali is delayed by several tens to several minutes, the curdlan first adapts to the water, and the alkali is then eluted from the coated alkali agent, meaning aggregates are less likely to form. However, preparation of the type of curdlan formulation described in Patent Document 2 requires the preparation of a coated alkali agent.

Accordingly, there is a demand for the development of a curdlan-containing composition which is unlikely to generate aggregates when dispersed in water, and with which a curdlan dispersion can be easily prepared.

CITATION LIST

Patent Literature

Patent Document 1: JP H10-042802 A
Patent Document 2: JP H11-075723 A

SUMMARY

Technical Problem

Objects of the present invention are to provide a curdlan-containing composition which is unlikely to generate aggregates when dispersed or dissolved in water, and with which a curdlan dispersion or solution can be easily prepared, and also to provide a foodstuff and any other products that contains the curdlan-containing composition.

Solution to Problem

The present invention provides a curdlan-containing composition that contains curdlan and an alkali salt, wherein the curdlan and the alkali salt are granulated.

In the curdlan-containing composition described above, the pH of the dispersion or aqueous solution obtained by dispersing or dissolving the curdlan-containing composition in water is preferably within a range from 10 to 13.

In the curdlan-containing composition described above, the alkali salt preferably contains at least one of trisodium phosphate, tripotassium phosphate and sodium hydroxide.

In the curdlan-containing composition described above, the curdlan content in the curdlan-containing composition is preferably within a range from 10 to 90% by weight.

In the curdlan-containing composition described above, the curdlan-containing composition is preferably able to be dispersed or dissolved in an amount of not more than 25% by weight in water of 3 to 55° C. within a period of 30 minutes or less.

Further, the present invention also provides a foodstuff and any other products that contains the curdlan-containing composition described above.

Advantageous Effects of Invention

In the present invention, by granulating the curdlan and the alkali salt, aggregates are unlikely to occur when the composition is dispersed or dissolved in water, and a curdlan dispersion or solution can be prepared easily. Further, a foodstuff and any other products that contains the curdlan-containing composition can be provided.

DESCRIPTION OF EMBODIMENTS

Embodiments of the present invention are described below. These embodiments are merely examples of implementing the invention, and the present invention is in no way limited by these embodiments.

A curdlan-containing composition according to an embodiment of the present invention contains curdlan and an alkali salt, wherein the curdlan and the alkali salt are granulated. The expression that the curdlan and alkali salt are "granulated" means that the curdlan and the alkali salt are incorporated within the same particles, and the average particle size of the particles described below is at least 90 µm. The curdlan-containing composition according to this embodiment is prepared by mixing the curdlan and the alkali salt and then granulating the mixture.

By granulating the curdlan and the alkali salt, aggregates are unlikely to occur when the composition is dispersed or dissolved in water, and a curdlan dispersion or solution can be prepared easily. By using the curdlan-containing composition according to this embodiment, a high concentration of curdlan can be dispersed or dissolved in water easily, and in a shorter period of time than conventional methods, while maintaining the thermocoagulation and water retention properties and the like of the curdlan.

By using the curdlan-containing composition according to an embodiment of the present invention, there is no need to separately prepare an alkaline solution and a dispersion containing the curdlan dispersed in water, and dispersion or dissolution can be performed in a single step, meaning the production process for the curdlan dispersion or aqueous solution can be simplified. Further, a coated alkali agent need not be prepared.

Further, because curdlan is a thermocoagulable material, if curdlan is added to hot water of about 50° C. using a conventional method, then preparing a substantially homogenous solution is difficult, particularly at high concentrations, but by using the curdlan-containing composition according to the present embodiment, a dispersion can be produced even when the composition is added to hot water of about 50° C.

The curdlan-containing composition according to the present embodiment is described below with particular reference to foodstuff and beverage applications and the like, but the composition can also be used in applications other than foodstuff related applications, including pharmaceuticals, industrial products, quasi-drugs, cosmetics and animal feed applications.

The curdlan used in the present embodiment is a thermocoagulable polysaccharide containing mainly β-1,3-glucosidic linkages produced by microbes. Examples of these polysaccharides include those produced by microbes of the genus *Alcaligenes* or the genus *Agrobacterium*. Specific examples of the curdlan include polysaccharides produced by *Alcaligenes faecalis* var. *myxogenes* 10C3K strain [Agricultural Biological Chemistry, Vol. 30, p. 196 (1996)], *Alcaligenes faecalis* var. *myxogenes* 10C3K strain variant NTK-u (IFO13140), *Agrobacterium radiobacter* (IFO13127), and a variant U-19 thereof (IFO13126). Commercially available curdlan may also be used.

Examples of the alkali salt used in the present embodiment include inorganic salts, for example, inorganic salts of alkali metals including alkali metal hydroxides (such as sodium hydroxide), alkali metal carbonates (such as sodium carbonate), alkali metal bicarbonates (such as sodium bicarbonate), and alkali metal salts of inorganic acids such as phosphoric acid (such as trisodium phosphate and tripotassium phosphate). The alkali salt is preferably an inorganic salt of an alkali metal, is more preferably an alkali metal salt of phosphoric acid or an alkali metal hydroxide, and in terms of suppressing the formation of aggregates upon dispersion or dissolution in water, is most preferably trisodium phosphate, tripotassium phosphate or sodium hydroxide. A single alkali salt may be used alone, or a combination of two or more alkali salts may be used. The alkali salt need not be subjected to a preliminary treatment such as coating.

The amount of the alkali agent in the curdlan-containing composition according to the present embodiment is adjusted so that the pH of the dispersion or aqueous solution obtained by dispersing or dissolving the curdlan-containing composition in water, for example the pH of the dispersion or aqueous solution obtained by dispersing or dissolving the curdlan-containing composition in water in an amount sufficient to achieve a curdlan content of 2% by weight, is typically a pH of 10 or higher, preferably 11 or higher, for example within a range from 10 to 13, and more preferably within a range from 11 to 13. If the pH of the obtained dispersion or aqueous solution is less than 10, then the liquid may sometimes not become a viscous liquid, whereas if the pH exceeds 13, then satisfactory thickening may sometimes not develop due to the overly strong alkali. When the curdlan-containing composition is added to water in an amount equivalent to a curdlan content of 2% by weight, the curdlan disperses in the water at pH values less than 11, and either disperses or dissolves in the water at pH values of 11 or higher.

The average particle size of the granulated particles in the curdlan-containing composition according to the present embodiment is preferably within a range from 90 to 1,000 μm, and is more preferably within a range from 100 to 300 μm. If the average particle size of the granulated particles is less than 90 μm, then aggregates are sometimes more likely to form upon dispersion or dissolution in water, whereas if the average particle size exceeds 1,000 μm, then dispersion of the particles in water requires considerable time, and it may be more difficult to form a dispersion or solution having a high curdlan concentration. The average particle size and the particle size distribution of the granulated particles can be measured using a laser diffraction particle size distribution analyzer (Mastersizer, manufactured by Malvern Instruments Ltd.) or sieves or the like.

The curdlan-containing composition according to the present embodiment can be obtained by mixing the curdlan and the alkali salt, and then using a granule production device such as a granulator, tablet press, extruder or fluidized bed granulator to granulate the mixture so that the curdlan and the alkali salt are contained within each of the particles in appropriate amounts and in a suitable formulation. In formulations obtained by performing homogenous mixing of the respective powders using a powder mixer such as a V-type mixer or a Nauta mixer, or by performing grinding and mixing of the components using a Henschel mixer or the like, the curdlan and the alkali salt may not be satisfactorily integrated inside the particles, meaning the effects described above may not be obtainable upon dispersion or dissolution. Accordingly, these types of production devices are not included among the devices that can be used for producing the curdlan-containing composition according to the present embodiment.

In the curdlan-containing composition according to the present embodiment, the curdlan content may be set within a range from 10 to 90% by weight. If the curdlan content is less than 10% by weight, then the effects of the curdlan may sometimes not manifest satisfactorily or be noticeable in the target material in which the composition is used, whereas if the curdlan content exceeds 90% by weight, then achieving a satisfactory effect for the alkali salt becomes more difficult, and it is thought that forming homogenous particles or a viscous liquid may also become more difficult. By using the curdlan-containing composition according to the present embodiment, dispersions having a high curdlan concentration, which have proven difficult to produce using conventional methods, can be produced with ease.

The curdlan-containing composition according to the present embodiment can be easily dispersed or dissolved in water in a high concentration in a short period of time. For example, the composition can be dispersed or dissolved in water of 3 to 55° C. in an amount of not more than 25% by weight, for example an amount of 1 to 25% by weight, within a period of 30 minutes or less, for example within a period of 30 seconds to 30 minutes. When using the curdlan-containing composition of the present invention, for example during dispersion, dissolution, stirring, and product production and the like, temperature adjustments such as heating may be performed. Heating may be performed at a temperature that facilitates the dispersion or dissolution of the curdlan-containing composition, for example a temperature of about 40 to 50° C.

The curdlan-containing composition according to the present embodiment may also include other components besides the curdlan and the alkali salt, provided these other components do not significantly affect the pH upon dispersion or dissolution. Examples of these types of other components include thickeners such as xanthan gum, guar gum, carob bean gum, tamarind seed gum, carrageenan, glucomannan, gellan gum and processed starch, saccharides such as sugar, starch syrup and dextrin, grain powders such as flour and starch, dietary fibers such as inulin and cellulose, fatty acid esters such as glycerol fatty acid esters and sorbitan fatty acid esters, and enzymes.

The curdlan-containing composition according to the present embodiment may not only be added to liquids such as water, juices and sauces, but may also be added directly to solid foodstuffs or powders such as meat or flour. The amount added of the curdlan-containing composition may be determined as appropriate depending on the type and state of the target material, and the curdlan content and the like of the curdlan-containing composition, but for example, the composition is typically added in an amount that provides a curdlan content of 0.1 to 10 parts by weight, and preferably 0.3 to 5 parts by weight, relative to the target material.

Examples of potential uses for the curdlan-containing composition according to the present embodiment include foodstuffs, beverages, pharmaceuticals, quasi-drugs, cosmetics, animal feed and industrial products containing the curdlan-containing composition. By incorporating the curdlan-containing composition according to the present embodiment, foodstuffs and any other products can be imparted with properties such as increased viscosity, gelling, water retention and adhesiveness. The form of the product or the preparation and processing method employed during use may differ.

Examples of the foodstuffs include processed meat items such as ham and sausages, processed seafood items such as kamaboko (fish paste), desserts such as jellies, puddings, mousses and yoghurts, daily dishes such as hamburger patties and croquettes, confectionary such as candies, gum and snacks, noodles such as Chinese noodles, udon, pasta and buckwheat noodles, confectionary such as cakes and cookies, treats including frozen desserts such as ice creams and sorbets, rice-based items such as rice cakes, rice balls and instant cooked rice, sauces and seasonings such as sauces and dressings, universal design foods such as food for people with dysphagia, nursing care food, minced food, thickened sauce-like food, and liquid food, and health food items such as tablets, soft capsules, hard capsules, candies and powdered formulations. Further, the form of the product or the preparation and processing method may also differ, including frozen foods, retort foods, and microwavable foods.

Examples of the beverages include soft drinks, fruit juices, tea beverages, coffee beverages, beverage powders, milk beverages, lactic acid bacteria beverages, carbonated beverages, fortified beverages and jelly-like beverages.

Examples of the pharmaceuticals include tablets, capsules, external skin preparations and ointments.

Examples of the quasi-drugs include quasi-drugs and the like prescribed in the Pharmaceutical Affairs Law, such as mouth fresheners, toothpastes and soaps.

Examples of the cosmetics include cosmetics for hair such as haircut products and hair rinses, and makeup cosmetics such as creams.

Examples of the animal feed include domestic animal foodstuffs for livestock and pets, and feed for farmed fish.

Examples of the industrial products include products for the chemical industry field such as adhesives and aromatics, and products for the construction materials field such as concrete.

EXAMPLES

The present invention is described below in further detail based on a series of examples and comparative examples, but the present invention is in no way limited by the following examples.

Example 1

Ninety parts by weight of curdlan (manufactured by MC Food Specialties Inc.), 4 parts by weight of tripotassium phosphate and 6 parts by weight of trisodium phosphate (manufactured by Organo Food Tech Corporation) were aggregated and granulated in a fluidized bed granulator (manufactured by Powrex Corporation) to produce a curdlan-containing composition. Measurement of the average particle size of the granulated particles in this curdlan-containing composition using a laser diffraction particle size distribution analyzer (Mastersizer, manufactured by Malvern Instruments Ltd.) yielded a result of 200 μm.

Subsequently, when the curdlan-containing composition of Example 1 was added to room temperature (20° C.±5° C.) water in an amount sufficient to generate a curdlan concentration of 2% by weight, and the mixture was then stirred and mixed for one minute with a propeller mixer, the pH of the liquid became 11.4, and visual inspection of the liquid revealed a substantially homogenous viscous liquid, with no formation of aggregates in the solution.

Example 2

Forty parts by weight of curdlan (manufactured by MC Food Specialties Inc.), 6 parts by weight of trisodium phosphate (manufactured by Organo Food Tech Corporation), 4 parts by weight of tripotassium phosphate and 50 parts by weight of dextrin (MAX1000, manufactured by Matsutani Chemical Industry Co., Ltd.) were aggregated and granulated in a fluidized bed granulator (manufactured by Powrex Corporation) to produce a curdlan-containing composition. The average particle size of the granulated particles in this curdlan-containing composition was 250 μm.

Subsequently, the curdlan-containing composition of Example 2 was added to room temperature water in an amount sufficient to generate a curdlan concentration of 2% by weight, and the mixture was either stirred for 5 minutes with a magnetic stirrer (Test Example 1) or stirred with a glass rod for 5 minutes (Test Example 2). In each test, the liquid reached a pH of 11.5, and was a substantially homogenous viscous liquid, with no formation of aggregates in the solution. Further, in Test Example 2, the composition was able to produce a high-concentration dispersion without using mechanical stirring such as a mixer, but rather simply by stirring by hand with a glass rod or the like without using a stirring device (albeit dependent on the method used for adding the composition), indicating that the composition enabled the production of a high-concentration curdlan solution far more easily than conventional compositions.

Example 3

Ninety nine parts by weight of curdlan (manufactured by MC Food Specialties Inc.), and 1 part by weight of tripotassium phosphate were aggregated and granulated in a fluidized bed granulator (manufactured by Powrex Corporation) to produce a curdlan-containing composition. The volume average particle size of the granulated particles in this curdlan-containing composition was 200 µm.

Subsequently, when the curdlan-containing composition of Example 3 was added to room temperature water in an amount sufficient to generate a curdlan concentration of 2% by weight, and the mixture was then stirred and mixed for 10 minutes with a propeller mixer, the pH of the liquid became 6.6, and the solution was dispersed substantially homogenously, with no formation of aggregates. However, the liquid did not become viscous, and after about 30 minutes, a sediment had appeared in the solution. Even after standing for 3 hours at room temperature, almost no change in this state was observed, and almost no viscosity development was observed.

Comparative Example 1

Sixty parts by weight of curdlan (manufactured by MC Food Specialties Inc.), 10 parts by weight of trisodium phosphate (manufactured by Organo Food Tech Corporation), 10 parts by weight of tripotassium phosphate and 20 parts by weight of dextrin (MAX1000, manufactured by Matsutani Chemical Industry Co., Ltd.) were mixed thoroughly with a powder mixer, thus producing a substantially homogenous formulation (powder mixture). The average particle size of the product was 46 µm.

Subsequently, when the formulation of Comparative Example 1 was added to room temperature water in an amount sufficient to generate a curdlan concentration of 2% by weight, and the mixture was then stirred for 10 minutes with a magnetic stirrer, a pH of 11.5 was obtained, but aggregates had formed, and precipitate formation was also observed. Even after standing for 3 hours at room temperature, almost no change in this state was observed, and almost no viscosity development was observed.

Example 4

Sixty parts by weight of curdlan (manufactured by MC Food Specialties Inc.), 20 parts by weight of trisodium citrate and 20 parts by weight of dextrin (MAX1000, manufactured by Matsutani Chemical Industry Co., Ltd.) were aggregated and granulated in a fluidized bed granulator (manufactured by Powrex Corporation) to produce a curdlan-containing composition. The average particle size of the granulated particles in this curdlan-containing composition was 200 µm.

Subsequently, when the formulation of Example 4 was added to room temperature water in an amount sufficient to generate a curdlan concentration of 2% by weight, and the mixture was then stirred for 10 minutes with a magnetic stirrer, an alkaline pH of 8.7 was obtained, and the solution was dispersed substantially homogenously, with no formation of aggregates. However, the liquid did not become a substantially homogenous viscous solution. After standing for 3 hours at room temperature, dispersion had still not occurred, and a sediment was noticeable.

Comparative Example 2

Seventy parts by weight of curdlan (manufactured by MC Food Specialties Inc.), 5 parts by weight of trisodium phosphate (manufactured by Organo Food Tech Corporation), 20 parts by weight of tripotassium phosphate and 5 parts by weight of dextrin (MAX1000, manufactured by Matsutani Chemical Industry Co., Ltd.) were aggregated and granulated in a fluidized bed granulator (manufactured by Powrex Corporation) to produce a formulation. The average particle size of the particles in the formulation was 80 µm.

Subsequently, when the formulation of Comparative Example 2 was added to room temperature water in an amount sufficient to generate a curdlan concentration of 2% by weight, and the mixture was then stirred for 3 minutes with a propeller stirrer, an alkaline pH of 11.6 was obtained, but the solution contained multiple aggregates, and even after standing for 3 hours at room temperature, a substantially homogenous viscous solution was not obtained.

Example 5

Seventy parts by weight of curdlan (manufactured by MC Food Specialties Inc.), 16 parts by weight of trisodium phosphate (manufactured by Organo Food Tech Corporation), 4 parts by weight of tripotassium phosphate and 10 parts by weight of dextrin (MAX1000, manufactured by Matsutani Chemical Industry Co., Ltd.) were aggregated and granulated in a fluidized bed granulator (manufactured by Powrex Corporation) to produce a curdlan-containing composition. The average particle size of the granulated particles in this curdlan-containing composition was 200 µm.

Subsequently, as illustrated in Table 1, using a series of water samples for which the water temperature had been adjusted, the liquid state when the composition was added in an amount sufficient to generate a curdlan concentration of 2% by weight and then stirred with a propeller stirrer was checked. The results revealed that a substantially homogenous dispersion was obtained for temperatures from 5° C. to 55° C., but at the higher temperature of 65° C., aggregate formation was confirmed, and even after standing for 3 hours, almost no change in the state of the dispersion was observed.

TABLE 1

| Water temperature | 5° C. | 20° C. | 40° C. | 55° C. | 65° C. |
|---|---|---|---|---|---|
| Liquid state | Dispersion | Dispersion | Dispersion | Dispersion | Aggregates formed, and a substantially homogenous dispersed state was not obtained |

Examples 6 to 10

Forty parts by weight of curdlan, 25 parts by weight of an alkali salt and 35 parts by weight of dextrin (SR-25, manufactured by Organo Food Tech Corporation) were aggregated and granulated in a fluidized bed granulator (manufactured by Powrex Corporation) to produce a series of curdlan-containing compositions. The alkali salts that were investigated are shown in Table 2. The average particle size of these curdlan-containing compositions was 180 µm.

Subsequently, each of the curdlan-containing compositions was added to 30° C. water in an amount sufficient to generate a curdlan concentration of 1.5% by weight, and the liquid state upon stirring with a propeller stirrer was checked. The results revealed that even when sodium carbonate was used as the alkali salt, no aggregates formed and the dispersibility was favorable, but the dispersibility was most favorable when tripotassium phosphate or sodium hydroxide was used. Further, when sodium polyphosphate or trisodium citrate was used as the alkali salt, although almost no aggregates formed, a satisfactory dispersion was not obtained, and a sediment formed.

TABLE 2

| | Example 6 Sodium hydroxide | Example 7 Tripotassium phosphate | Example 8 Sodium carbonate | Example 9 Sodium polyphosphate | Example 10 Trisodium citrate |
|---|---|---|---|---|---|
| pH | 12.3 | 11.5 | 11.3 | 9.4 | 7.9 |
| Liquid state | Most favorable dispersibility | Most favorable dispersibility | Dispersed, and particles swelled, but a sediment formed | Dispersed, and particles swelled somewhat, but a sediment formed | Dispersed, and particles swelled slightly, but a sediment formed |

The invention claimed is:

1. A curdlan-containing composition comprising curdlan and an alkali salt, wherein
   the curdlan and the alkali salt are granulated,
   an average particle size of the granulated particles is within a range from 90 to 300 μm, and
   the curdlan is a polysaccharide containing mainly β-1,3-glucoside linkages.

2. The curdlan-containing composition according to claim 1, wherein
   a pH of a dispersion or aqueous solution obtained by dispersing or dissolving the curdlan-containing composition in water is within a range from 10 to 13.

3. The curdlan-containing composition according to claim 1, wherein
   the alkali salt comprises at least one of trisodium phosphate, tripotassium phosphate and sodium hydroxide.

4. The curdlan-containing composition according to claim 1, wherein
   an amount of the curdlan in the curdlan-containing composition is within a range from 10 to 90% by weight.

5. The curdlan-containing composition according to claim 1, wherein
   the curdlan-containing composition is able to be dispersed or dissolved in an amount of not more than 25% by weight in water of 3 to 55° C. within a period of 30 minutes or less.

6. A method for producing a curdlan-containing product, comprising:
   adding the curdlan-containing composition according to claim 1 with a liquid or solid in order to obtain the curdlan-containing product.

* * * * *